United States Patent [19]

Biernath

[11] 4,334,512

[45] Jun. 15, 1982

[54] CONNECTING CONDUIT ARRANGEMENT

[75] Inventor: Siegfried Biernath, Bonn, Fed. Rep. of Germany

[73] Assignee: Klöckner-Humboldt-Deutz AG, Cologne, Fed. Rep. of Germany

[21] Appl. No.: 84,422

[22] Filed: Oct. 12, 1979

[30] Foreign Application Priority Data

Oct. 12, 1978 [DE] Fed. Rep. of Germany ........ 2844489

[51] Int. Cl.³ .................................................. F02B 77/00
[52] U.S. Cl. ................................................... 123/469
[58] Field of Search .................. 138/106, 92; 285/157, 285/188, 185, 191; 123/468, 469, 470; 137/561 A

[56] References Cited

U.S. PATENT DOCUMENTS

| | | | |
|---|---|---|---|
| 583,864 | 6/1897 | Cash | 285/188 |
| 3,736,986 | 6/1973 | Magdars | 285/185 X |
| 3,783,842 | 1/1974 | Kuhn | 123/469 X |
| 3,929,109 | 12/1975 | Chamberlain | 123/468 |

*Primary Examiner*—William R. Cline
*Attorney, Agent, or Firm*—Becker & Becker, Inc.

[57] ABSTRACT

A connecting conduit arrangement with several branch sections which lead to attachment points where hollow fasteners are provided. The arrangement includes a drain conduit connectible to injector-nozzle holders of internal combustion engines with fuel injection. A one-piece conduit is included in the arrangement having at least one branch section. The branch section is bent at an angle of about 180° in the vicinity of the attachment point to provide a bent branch section. A connecting part is also disclosed which is operatively associated with the hollow fastener belonging therewith.

6 Claims, 16 Drawing Figures

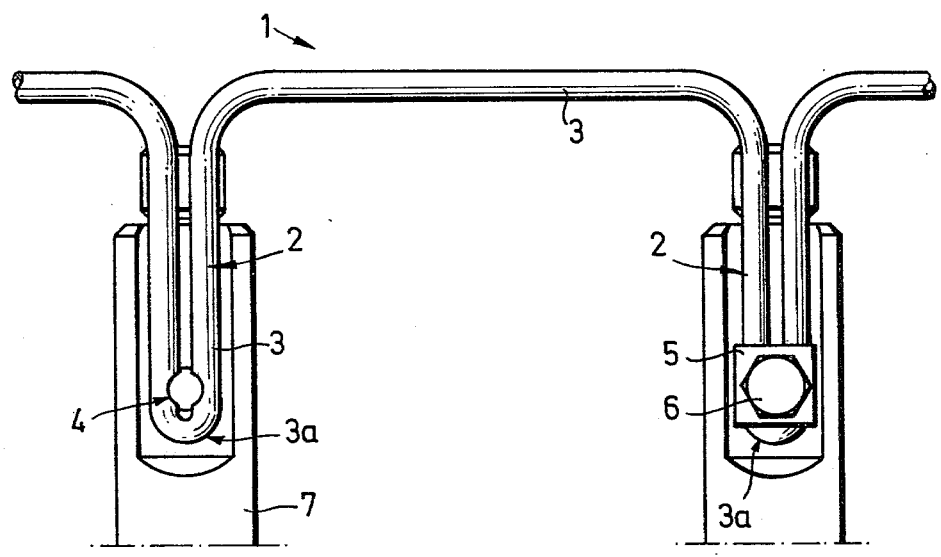
FIG.1
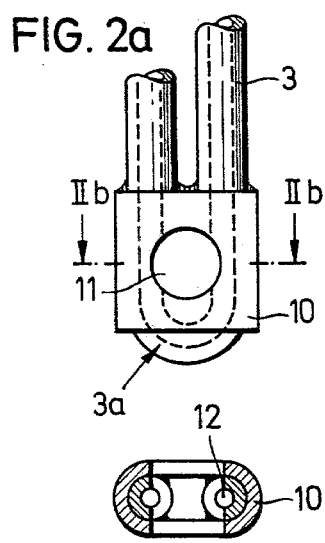
FIG. 2a
FIG. 2b
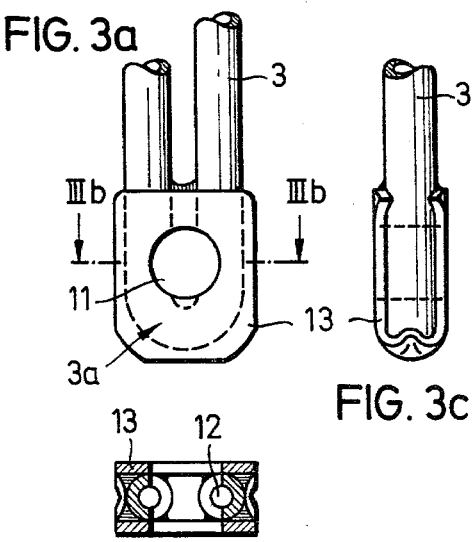
FIG. 3a
FIG. 3b
FIG. 3c

CONNECTING CONDUIT ARRANGEMENT

The present invention relates to a collecting or connecting conduit arrangement, with several branch sections which lead to attachment points where hollow fasteners are provided. The arrangement includes a drain conduit operatively connectible to injector-nozzle holders of internal combustion engines with fuel injection.

BACKGROUND OF THE INVENTION

It is generally known to secure drain conduits at the injector-nozzles with standard annular parts (produced in accordance with German Industrial Standard DIN 7622), and with standard hollow fasteners (produced according to German Industrial Standard DIN 7632). In certain situations, the annular part is in the form of a double or duplex annular part with a short connecting conduit for the inlet section of the duct and a short connecting conduit for the outlet section of the conduit. However, when space is restricted, the inlet and outlet have to be approximately axis-parallel to the injector-nozzle holder. In such situations duplex annular parts with oppositely arranged connections cannot be used. To avoid this, prefabricated annular parts can be provided having two connections which are arranged in V-form. However, this would be very expensive and is, accordingly, not desirable.

FIELD OF THE INVENTION

An object of the present invention is to provide a connecting conduit of the aforementioned type, especially an arrangement including a drain conduit for internal combustion engines which are improved in such a way to be utilized in restricted space situations, and, furthermore, adapted to be produced in a simple and economical manner.

This object and other objects and advantages of the invention will appear more clearly from the following specification in connection with the accompanying drawings, in which:

FIG. 1 is a side elevational view of an arrangement in accordance with one embodiment of the invention in which two injector-nozzle holders are shown relative to which a collecting conduit arrangement is secured;

FIGS. 2a and 2b are, respectively, a side elevational view of a branch portion with a connecting part, and a cross-sectional view along line IIb—IIb in FIG. 2a;

Figure 4A:
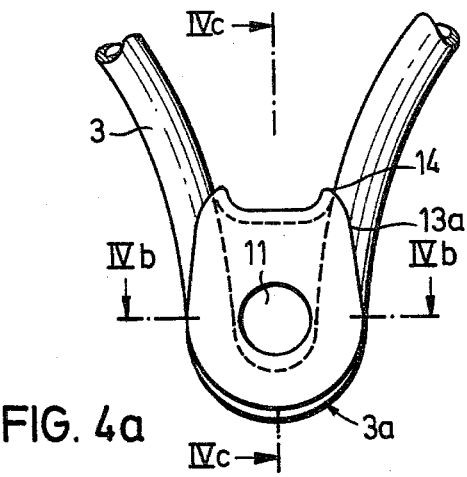
Figure 4B:
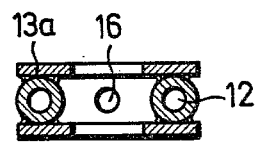
Figure 4C:
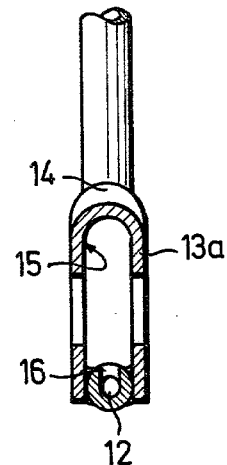
Figure 5A:
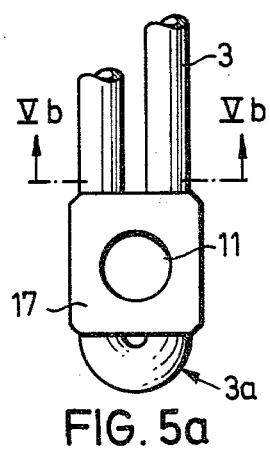
Figure 5B:
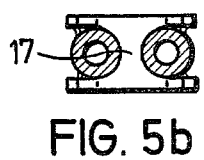
Figure 5C:
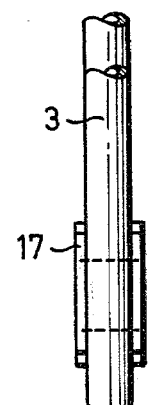
Figure 5D:
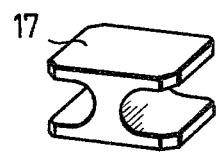
Figure 6A:
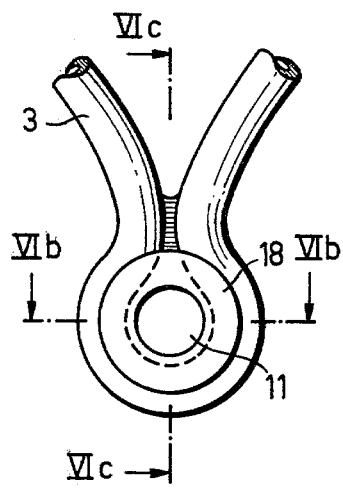
Figure 6C:
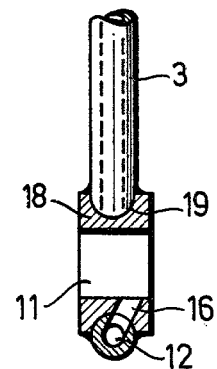
Figure 6B:
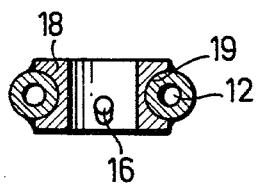

FIGS. 3a, 3b, and 3c are, respectively, a side elevational view and a cross-sectional view of a further embodiment of a connecting part in accordance with the present invention, with FIG. 3b being a cross-sectional view along line IIIb—IIIb in FIG. 3a;

FIGS. 4a, 4b, and 4c are views similar to the representations in FIGS. 3a–c for illustration of another embodiment of a connecting part in accordance with the present invention;

FIGS. 5a, 5b, 5c, and 5d are views similar to FIGS. 3a–c and illustrate another embodiment of a connecting part in accordance with the present invention, with FIG. 5d being a perspective view of the pertaining connecting part; and FIGS. 6a, 6b, and 6c illustrate another embodiment of a connecting part and a modified attachment of the branch section, with FIGS. 6c and 6b, respectively, being cross sections along lines VIc–VIc and VIb–VIb.

SUMMARY OF THE INVENTION

The arrangement in accordance with the present invention is characterized primarily therein that there is provided a one-piece conduit having at least one branch section. The branch section is bent at an angle of about 180° in the vicinity of the pertaining attachment point of the conduit to the injector-nozzle holder to provide a bent branch section. Accordingly the inner radius or bending curvature is less than or equal to one half the diameter of a pertaining hollow screw or similar fastener and/or equal to one half of a connecting part mounted in the bent branch section. The invention is furthermore characterized therein that each one of the branch sections is bent at a point remote from the attachment point at an angle which is ½ the angle of curvature of the bent branch section. The invention is still further characterized therein that at the attachment points there is provided a connecting part which is operatively associated with the pertaining hollow fastener and sealingly connectible with the interior of the conduit.

This arrangement permits use of a standard relatively dense-walled conduit, e.g. a tube having an inner diameter of 4 mm and a wall thickness of 1 mm, which is formed by bending into a generally M-shaped configuration to generally provide the desired collecting conduit. At the narrow spaced branch section which is bent through an angle of about 180°, there are sealingly connected connecting parts, preferably by soldering, so that an attachment is feasible by means of a customary hollow screw provided either with or without an outer annular groove.

In accordance with a preferred embodiment of the invention, the connecting part comprises a flattened tube section which is placed over the bent branch section in the region of the attachment point, with the connecting part being sealingly connected to the conduit, preferably by soldering. After soldering, a hole is drilled through the flattened tube section. Care must be taken then that the bent branch section is so narrow, or the bore or passage in the hollow fastener is of such a dimension so that at least one inner wall of the bent branch section is removed to provide communication between the hollow fastener and the conduit proper.

In accordance with another preferred embodiment, the connecting part is in the form of a U-shaped strip which is arranged so as to overlap or cover the bent branch section at the attachment point this flat strip is sealingly connected to the bent branch section. The attachment or securement can be attained by soldering and again a hole is drilled as mentioned before. It should be further mentioned that the strip or sheet metal material of which this connecting part is formed, is preferably a steel sheet metal with one side thereof being coated e.g. brass-plated, so that the brass plating serves as hard-solder for resistance or induction soldering.

In accordance with another preferred embodiment, the U-shaped strip forming the connecting part is laterally connected between the branch section, with the connecting part being inserted between the bent branch section at the attachment point and sealingly connected to the conduit. This connecting part can also be secured by soldering, with a hole being subsequently drilled. This connecting part initially can be generally of the shape of the number 8 and can be predrilled. The positioning of the connecting part between the legs of the branch section provides that the connection part is provided from the inner side with a positive support on the inner curvature of the conduit so that also here the brass-plating assures a simple soldering. This arrangement provides an inner hollow space which is in communication by means of the pertaining bore with the interior of the conduit. In this case, the bore or passage can also be provided prior to soldering of the connecting part. Because of this, a simple economical hollow screw without an outer annular groove can be used.

In accordance with another preferred embodiment of the invention, the connecting part is generally H-shaped, is arranged between the legs of the bent branch section, and is sealingly connectible to the conduit. This connecting part is used similar to the flattened tube section but is placed between the legs of the bent branch section.

In accordance with another preferred embodiment of the invention the connecting part is provided by an annular member having a circumferential outer groove with a curvature which corresponds to the outer diameter of said one-piece conduit. This connecting part is sealingly connectible to the conduit and insertable between the legs of the bent branch section. Such an annular member affords a stable configuration of the collecting conduit whereby the connecting hole between the interior of the conduit and the bore in the annular member can be produced after assembly of the two parts.

In accordance with another embodiment of the invention, the communication between the interior of the conduit and the connecting part is provided by removing part of the tube wall during the subsequent manufacture of the bore or passage for the hollow screw in the connecting part.

In accordance with another preferred embodiment of the invention, communication between the interior of the conduit and the connecting part and/or the bore for the hollow fastener in the connecting part, is produced by a connecting bore or passage in the wall of the bent branch section near the attachment point.

DESCRIPTION OF THE PREFERRED EMBODIMENTS

Referring now particularly to the drawings, in FIG. 1 a collecting or connecting conduit, generally designated by numeral 1, and two injector-nozzle holders 7 are shown. The collecting conduit includes a substantially continuous conduit, tube, or similar one-piece duct which includes, on the lefthand side of the drawing, a straight section which continues in a 90° bend to the right to form one leg of a branch section 2. The branch section 2 extends perpendicular towards the attachment or connecting point or location, generally designated by numeral 4, and is then curved to the right through an arc of substantially 180° to form a bent branch section 3 and to form the second leg of said branch section 2. This second leg extends generally parallel to the first leg. The conduit then reverts back to the straight section by the 90° turn towards the right, with the straight section being continued until the next branch section 2 leads to a next injector-nozzle holder 7. Thus, straight sections are followed by curves. At the bent branch section 3a there is provided the attachment point 4 at which a connecting part 5 is connected. The connecting part 5 is secured by means of a hollow screw or similar fastener 6 to the injector-nozzle holder 7 by customary interpositioning two seal rings therewith, not shown.

In essence, the branch sections 2 form U-shaped sections having opposed parallel legs connected by a bight 3a which is positioned adjacent the drains of the fuel injection nozzle holders 7.

In the embodiment according to FIG. 2a and FIG. 2b, the connecting part 5 is slipped, as it were, over the bent branch section 3a and soldered to conduit 3. The connecting part in this embodiment is in the form of a flattened tube section generally designated by numeral 10. A hole or passage 11 is produced after mounting the section 10; the hole 11 passes through the section 10 and the conduit 3 so that, in accordance with FIG. 2b, the conduit 3 is cut two times and a communication is provided between the interior 12 of conduit 3 and the bore 11 and, therefore, with the hollow screw 6.

The embodiment shown in FIGS. 3a–3c differs from the embodiment in FIGS. 2a and 2b inasmuch as the connecting part is provided by a U-shaped strip, generally designated by numeral 13, which surrounds from below the bent branch section 3a and which is secured thereto by soldering. The bore 11 is then subsequently produced and provides the desired communication.

In FIGS. 4a–4c there is provided a connecting part comprising a U-shaped strip 13a which is positioned with its folded-over portion 14 between the legs of the bent branch section 3a to be subsequently soldered to the conduit. The side or connection 14 is adapted to follow the conduit outline so that a tight or sealing hollow space is produced between the conduit and the connecting part 13a. Soldering of part 13a to the conduit is made easier in such a way that the strip material is provided on its inner wall, designated by 15 as indicated in FIG. 4c, with a brass layer serving as solder, so that in a simple manner and without addition of soldering material being required, this connection can be achieved. The connecting part in accordance with FIGS. 3 and 4 can be preformed and provided with the bores or passages, or these bores can be produced subsequently. As can be further derived from FIGS. 4b and 4c, in the region of the bent branch section 3a there is produced a connecting bore or passage 16 in the wall of the conduit 3, prior to securement of the connecting part 13a. This bore is generally designated by numeral 16, and provides for communication of the interior 12 of the conduit 3 and the interior of the connecting part 13a.

The embodiment according to FIGS. 5a–5d shown an H-shaped connecting part which is arranged and secured to the conduit 3 in accordance with the embodiments of FIGS. 2a and 2b. Thus, after assembly of connecting part 17, a hole or passage 11 is produced in this connecting part 17.

The connecting part shown in FIGS. 6a–6c is in the form of an annular ring member 18 which is furnished with a circumferential groove 19 having a radius of curvature in conformity with the outer diameter of the conduit 3 so that the conduit is arranged in the groove 19 and soldered to the annular member 18. The connecting bore 16 is produced subsequently and extends through the wall of conduit 3 and through the annular member 18.

It is pointed out that particularly for the connecting parts according to FIGS. 4a–4c, and 6a–6c, the conduit is not bent as is indicated in FIG. 1, since the turns are formed by a substantially greater radius, so that the legs of the bent branch sections do not extend parallel to one another. This is feasible when more space is available. The most advantageous spatial utilization is obtained with connecting parts as suggested in FIGS. 2a and 2b, FIGS. 3a–3c, and FIGS. 5a–5d and a conduit outline as suggested in FIG. 1.

The present invention is, of course, in no way restricted to the specific disclosure of the specification and drawings, but also encompasses any modifications within the scope of the appended claims.

What I claim is:

1. A connecting conduit arrangement for connecting a drain conduit with hollow attachment screws to the drains of fuel injection nozzle holders of an internal combustion engine, the arrangement comprising:

a tube comprising a substantially straight section extending between two fuel injection nozzle holders, the straight section having U-shaped sections each formed of two opposed legs joined by a bight and extending at approximately 90° to the straight section, the U-shaped sections connecting the straight section to adjacent straight sections and extending to the drains of the nozzle holders with the bight portions of the U-shaped sections positioned adjacent the drains, the opposed legs of the U-shaped sections having opposed cut-outs through the walls thereof in alignment with the drains to establish communication therewith and through which is received one of the hollow attachment screws;

a connecting part fitting over the opposed legs, the connecting part having having a hole therethrough aligned with the opposed cut-outs and a flat surface against which the head of the hollow attachment screw seals, whereby communication between the drain and conduit is established through the hollow attachment screw.

2. The connecting conduit of claim 1 wherein the bight is curved through approximately 180°.

3. The connecting conduit of claim 2 wherein the connecting parts are flattened tubes which surround the opposed legs and are sealed with respect thereto.

4. The connecting conduit of claim 3 wherein the connecting parts are sealed with solder.

5. The connecting conduit of claim 4 wherein the connecting parts are U-shaped clips which fit over the bights and opposed legs and are sealed with respect thereto.

6. The connecting conduit of claim 5 wherein the connecting parts are sealed with solder.

* * * * *